United States Patent
Humlicek (12) 
(10) Patent No.: US 6,332,177 B1
(45) Date of Patent: Dec. 18, 2001

(54) N-WAY RAID 1 ON M DRIVES BLOCK MAPPING

(75) Inventor: Donald R. Humlicek, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/174,790

(22) Filed: Oct. 19, 1998

(51) Int. Cl.[7] ............................. G06F 12/00; G06F 12/16
(52) U.S. Cl. ............................. 711/114; 711/4; 711/203
(58) Field of Search ............................. 711/4, 114, 162, 711/202, 203, 206

(56) References Cited

U.S. PATENT DOCUMENTS

| | | | |
|---|---|---|---|
| 4,796,098 | 1/1989 | Giddings | 386/47 |
| 5,148,432 | 9/1992 | Gordon et al. | 714/7 |
| 5,390,313 | 2/1995 | Yanai et al. | 711/112 |
| 5,463,758 | 10/1995 | Ottesen | 711/114 |
| 5,542,064 * | 7/1996 | Tanaka et al. | 711/114 |
| 5,636,356 * | 6/1997 | Kakuta et al. | 711/114 |
| 5,678,061 | 10/1997 | Mourad | 710/21 |
| 5,917,998 * | 6/1999 | Cabrera et al. | 711/114 |
| 6,076,143 * | 6/2000 | Blumenau | 711/114 |

OTHER PUBLICATIONS

Rotem, Doron et al., "I/O Performance of Fully–Replicated Disk Systems", Second Workshop on the Management of Replicated Data, 1992, pp. 68–71.*

S. Ng et al.; Maintaining Good Performance in Disk Arrays During Failure Via Uniform Parity Group Distribution; Proceedings of the First International Symposium on High-–Performance Distributed Computing, 1992; pp. 260–269.

S. Ng et al.; Uniform Parity Group Distribution in Disk Arrays, IBM Research Division Computer Science Research Report RJ 8835 (79217); 1992.

Mark Holland; On–Line Data Reconstruction Disk Arrays; Dissertation Dept. of Electrical and Computer Engineering Carnegie Mellon University; 1994; pp. 1–240.

General Information on Raid (Redundant Array of Independent Disks). ICP Vortex [Online]; www.serve.com/icp/supp/info/levels.e.html; Printed Nov. 26, 1997.

Virtual Disk Types, [Online]//scohelp.tomcat.ru: 457/osad-ming/vdmc.vdtypes.html#vdmc.raid10; printed Nov. 28, 1997.

Design, Modeling, and Evaluation of High Performance I/O Subsystems, Dialog Web, printed Dec. 1, 1997, Dissertation abstract (Shenze Chen, 1992).

* cited by examiner

Primary Examiner—Reginald G. Bragdon (57) ABSTRACT

A disk mirroring method operable in a disk array storage system for storing N images of a block of data across M drives (N>=3 and M>=N) to enhance flexibility in configuration of mirrored and non-mirrored LUNs. Each of the N copies of data resides on a different drive such that if N-1 drives fail, the original block of data is recoverable. Data blocks may be striped or non-striped over the plurality of drives. Where the data is striped, each segment of the stripe has at least two mirrored images on other drives of the array. The present invention therefore enhances configuration flexibility as compared to prior techniques because all drives of the array may be used for mirrored copies regardless of the number of drives. The present invention therefore does not waste space where, for example, an odd number of drives are configured in the LUN. Further, as compared to prior techniques, the present invention permits configuration of more highly reliable LUNs by allowing for more mirrored copies of all data written to the LUN. Furthermore, the mirroring method of the present invention allows a snapshot of the original image or copies of the original image without interrupting reliable mirrored operation of the storage subsystem. One of multiple mirrored images may be used as a frozen snapshot copy while other mirrored copies permit continued mirrored, reliable operation of the LUN. Such backup snapshots may be used for purposes of backup or other purposes.

5 Claims, 5 Drawing Sheets

N-WAY RAID 1 ON M DRIVES BLOCK MAPPING

BACKGROUND OF THE INVENTION

1. Field of the Invention

This invention relates to data storage subsystems and, more particularly, to block mapping methods and associated structures for mirroring N images of a block of data across M drives to more effectively combine mirroring and non-mirroring LUNs within a group of drives in an array storage subsystem.

2. Discussion of Related Art

Typical computing systems store data within devices such as hard disk drives, floppy drives, tape, compact disk, etc. These devices are otherwise known as storage devices. The storage capacity of these storage devices has rapidly increased as computing applications' demand for storage have increased. Simultaneous with the increase in capacity, computer applications and users have demanded increased performance. Computing applications have become highly dependent on high performance, high capacity storage devices. However, such increased dependency on storage devices underscores the need for increased reliability of such storage subsystems. Failure of such high capacity, high performance storage devices and subsystems can cripple vital computing applications.

Disk array storage systems provide both improved capacity and performance as compared to single disk devices. In a disk array storage system, a plurality of disk drives are used in a cooperative manner such that multiple disk drives are performing, in parallel, the tasks normally performed by a single disk drive. Striping techniques are often used to spread large amounts of information over a plurality of disk drives in a disk array storage system. So spreading the data over multiple disk drives improves perceived performance of the storage system in that a large I/O operation is processed by multiple disk drives in parallel rather than being queued awaiting processing by a single disk drive.

However, adding multiple disk drives to a storage system reduces the reliability of the overall storage system. In particular, spreading data over multiple disk drives in a disk array increases the potential for system failure. Failure of any of the multiple disk drives translates to failure of the storage system because the data stored thereon cannot be correctly retrieved.

RAID techniques are commonly used to improve reliability in disk array storage systems. RAID techniques generally configure multiple disk drives in a disk array in geometries that permit redundancy of stored data to assure data integrity in case of various failures. In many such redundant subsystems, recovery from many common failures can be automated within the storage subsystem itself due to the use of data redundancy, error codes, and so-called "hot spares" (extra disk drives which may be activated to replace a failed, previously active disk drive). The 1987 publication by David A. Patterson, et al., from University of California at Berkeley entitled *A Case for Redundant Arrays of Inexpensive Disks* (*RAID*), reviews the fundamental concepts of RAID technology.

RAID level zero, also commonly referred to as disk striping, distributes data stored on a storage subsystem across a plurality of disk drives to permit parallel operation of a plurality of disk drives thereby improving the performance of I/O write requests to the storage subsystem. Though RAID level zero functionality improves I/O write operation performance, reliability of the disk array subsystem is decreased as compared to that of a single large disk drive. To improve reliability of disk arrays, other RAID geometries for data storage include generation and storage of redundancy information to permit continued operation of the disk array through certain common failure modes of the disk drives in the disk array.

There are six other "levels" of standard RAID geometries which include redundancy information as defined in the Patterson publication. Other RAID geometries have been more recently adopted and utilize similar concepts. For example, RAID level six provides additional redundancy to enable continued operation even in the case of failure of two disk drives in a disk array.

The simplest array, a RAID level 1 system, comprises one or more disks for storing data and an equal number of additional "mirror" disks for storing copies of the information written to the data disks. The remaining RAID levels, identified as RAID levels 2, 3, 4 and 5 systems by Patterson, segment the data into portions for storage across several data disks. One or more additional disks are utilized to store error check or parity information. RAID level 6 further enhances reliability by adding additional redundancy information to permit continued operation through multiple disk failures. The methods of the present invention may be useful in conjunction with any of the standard RAID levels including level 0.

RAID storage subsystems typically utilize a control module (controller) that shields the user or host system from the details of managing the redundant array. The controller makes the subsystem appear to the host computer as one (or more), highly reliable, high capacity disk drive. In fact, the RAID controller may distribute the host computer system supplied data across a plurality of the small independent drives with redundancy and error checking information so as to improve subsystem reliability. The mapping of a logical location of the host supplied data to a physical location on the array of disk drives is performed by the controller in a manner that is transparent to the host system. RAID level 0 striping for example is transparent to the host system. The data is simply distributed by the controller over a plurality of disks in the disk array to improve overall system performance.

To further improve performance. RAID subsystems frequently provide large cache memory structures. The cache memory is associated with the control module such that the storage blocks on the disk array are mapped to blocks in the cache. This mapping is also transparent to the host system. The host system simply requests blocks of data to be read or written and the RAID controller manipulates the disk array and cache memory as required.

A RAID level 1 disk array storage system, as presently known in the art, comprises one or more disks for storing data and an equal number of additional duplicate or mirror disks for storing copies of the information written to the data disks.

RAID level 1 techniques as presently practiced generally use a pair of disk drives for mirroring of data. A first disk drive is used to store the original data and the second is used to mirror the data. Striping of data (also known as RAID level 0), as noted above, is often used to improve performance. It is therefore known in prior techniques to combine striping (RAID level 0) with mirroring (RAID level 1) to provide improved performance and improved reliability through redundancy.

Whether striped or non-striped, RAID level 1 as presently practiced utilizes a single duplicate copy of the data—a single mirror. Some present striped RAID level 1 implementations allow for an odd number of disk drives to be used in the RAID level 1 mirroring. However, such storage device still maintain only a single mirror copy of the stored data. Each striped block has a single mirrored block associated therewith. The striping may distribute the original and mirrored block over any number of disk drives so long as the original block and mirrored block are resident on different disk drives to assure the needed reliability.

RAID level 1 improves reliability as compared to RAID level 0 by adding the capability to mirror or copy data on duplicate disk drives. RAID level 0, also known as disk striping, distributes data across the disks in the array but does not provide any data redundancy.

RAID levels 2–6 utilize RAID level 0 striping techniques to distribute the data over the plurality of disk drives in the array. RAID levels 2–6 use redundancy information which requires less storage capacity as compared to RAID level 1 mirroring. Specifically, redundancy information such as bitwise parity exclusive-OR (XOR) computations are used to reconstruct the missing portions of a stripe lost due to a single disk failure. Storage of such redundancy information requires far less storage than complete mirroring of the original data.

RAID levels 2–6 differ from one another primarily in the geometry used for storing data on the disks of the array. RAID levels 2, 3, and 4, distribute data across the disks in the array and provide for blocks of redundancy information stored on an additional dedicated disk. For example, RAID 3 and 4 includes N+1 disks where N disks are used to store the data, and the additional disk is utilized to store parity information. In a RAID level 5 disk array, the data and parity information are distributed and interspersed across the N+1 disks. Each one of the N+1 disks within the array includes some blocks for storing data and some blocks for storing parity information. Raid level 6 uses N+2 disks and distributes data and redundancy information over all the drives. RAID level 6, much like level 5, distributes redundancy information over the disks in the managed array but uses additional redundancy information (e.g., two parity blocks corresponding to each stripe of data blocks). The additional redundancy information of RAID level 6 allows recovery from additional errors beyond that provided by other RAID levels.

3. Problems in the Art

In large RAID systems having a larger number of disk drives, the disk drives may be apportioned into groups or subsets. Each group is also referred to as a redundancy group, or logical unit (LUN), and is managed in accordance with a particular RAID management level and different portions of each disk may be members of different LUNs. Each such LUN essentially appears to the attached computer system users and applications to be a single, large, highly reliable disk drive.

In general, each LUN uses an equal number of blocks from each disk drive, which is a member of the LUN subset to define a stripe of data. In large systems, many such LUNs may be defined, each managed in accordance with a preferred RAID management level. For example, one LUN may be managed in accordance with RAID 3 techniques while another LUN may be managed in accordance with RAID 5 techniques.

As noted above, the RAID level 1 LUN requires at least a pair of disk drives with one disk drive providing a copy of the contents of the other. Even where a RAID level 1 is striped over an odd number of disk drives, the data (each block of a stripe) is mirrored on a pair of disk drives. Other RAID levels which use redundancy techniques other than mirroring do not permit use of merely two disk drives. Rather, the number of disk drives needed for the additional redundancy information is always less than the number used for storing the data. Because of these different mapping of data and geometry of RAID management, some present RAID disk array storage subsystems do not readily allow the combination of LUNs implementing mirroring and other redundancy algorithms. Many prior techniques are limited in their flexibility to configure both mirrored RAID level 1 LUNs and other RAID levels in the same storage subsystem. At a minimum, they are so limited with respect to mixing such varied geometries on the same physical drives. Some such prior techniques require that the number of disk drives used for a mirrored LUN be even. Where an odd number of disk drives is used in a particular group of the disk array, such prior techniques simply fail to utilize the storage space of the last disk drive. Such wasted storage space increases the effective cost of storage systems.

Figure 6:
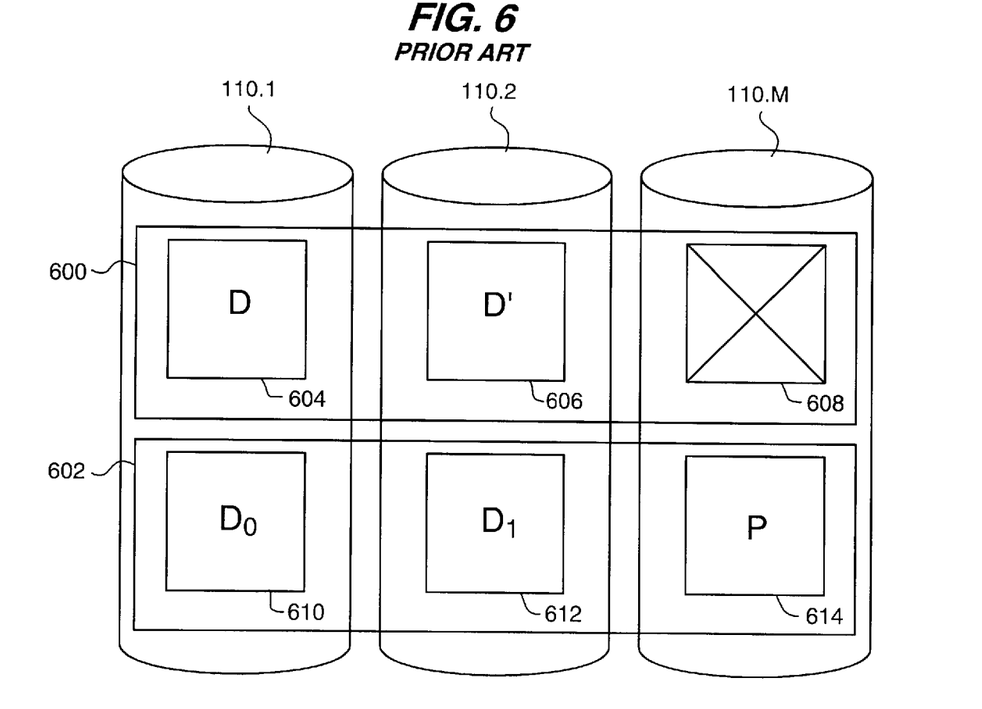
FIG. 6 is a block diagram depicting a first problem with prior mapping techniques for mirrored LUNs.

FIG. 6 is a block diagram depicting three disk drives 110.1 through 110.M on which a mirrored LUN 600 and a non-mirrored LUN 602 are defined in accordance with prior known techniques. As noted above, RAID parity techniques may be used in the non-mirrored LUN 602 to assure reliability of the stored data. A first portion of the stored data $D_0$ 610 and a second portion $D_1$ 612 are stored on drives 110.1 and 110.2, respectively. A redundancy portion P 614 is stored on the third disk drive 614. The mirrored LUN 600 does not utilize all drives because as dictated by some prior mirroring techniques which require only pairs of disk drives be utilized. Specifically, a data drive D 604 and a mirrored drive D' 606 contain the original data and the mirrored version thereof. Space 608 of LUN 600 is unused and wasted in such prior techniques.

Other RAID storage products partially resolve the above identified problem by allowing the mapping of blocks of data and their respective mirrored blocks over any number of disk drives. However, all such known systems are still limited to a single duplicate (mirrored) image of each data block. These systems require some flexibility in the mapping of blocks of data in the various RAID LUNs and may cause waste of space on certain disk drives of the array due to inflexibility in the configuration. Where, for example, the number of disk drives used for RAID level 1 mirrored LUN is odd, space on one of the disk drives may be wasted.

Figure 7:
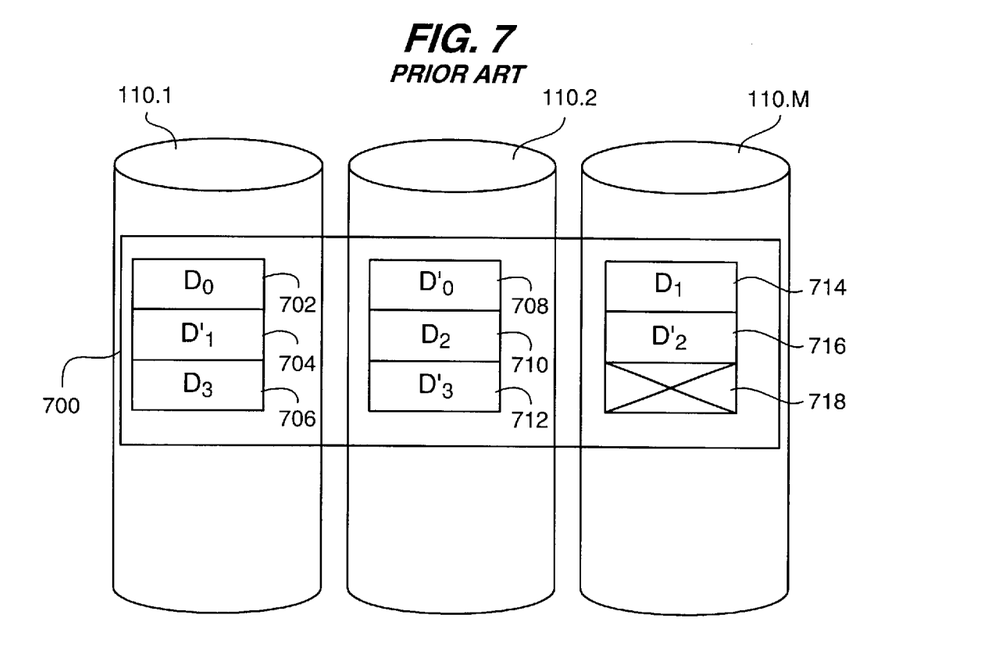
FIG. 7 is a block diagram depicting a second problem with prior mapping techniques for mirrored LUNs.

FIG. 7 is a block diagram descriptive of such other prior known mirroring techniques where space at the end of a mirrored LUN may be wasted. As shown in FIG. 7, three disk drives 110.1, 110.2 and 110.M are used for a mirrored LUN 700 on which blocks (portions) of the original data are striped over the three disk drives. In particular, block $D_0$ 702 and its mirror $D_0'$ 708 are stored on disk 110.1 and 110.2, respectively. In like manner, $D_1$ 714 and $D_1'$704, $D_2'$710 and $D_2'$716 and $D_3'$706 and $D_3'$ 712 are distributed over respective disk drives among 110.1 through 110.M. However, since the total number of blocks in the LUN 700 is odd, a block 718 at the end is wasted and remains unused.

It is therefore a problem in RAID storage subsystems to flexibly manage the storage space of the disk array to permit mixing of LUNs of different RAID levels. In particular, it is a problem to permit such mixing of different RAID level LUNs on the same physical drives of a disk array storage subsystem.

SUMMARY OF THE INVENTION

The present invention solves the above and other problems, thereby advancing the useful arts, by providing a block mapping method operable for duplicating N (greater than 2) images of a block of data across M (greater than or equal to N) drives to enable more flexibility in configuring LUNs within the same group of disk drives. In accordance with the present invention, mirroring techniques are utilized to store the original data and to generate and store N−1 duplicate images of every block of original data. The N blocks of information are then stored over M disk drives where N is greater than two and M is greater than or equal to N. The added flexibility of mirroring to more than one duplicate drive allows for easier configuration of mirrored and non-mirrored LUNs in a disk array storage system.

The original data and each copy of the original data resides on a different drive in the disk array such that if N−1 drives fail, the original block of data is usable and recoverable. The present invention therefore provide the additional benefit of tolerating more disk drive failures than previous techniques. Where previous techniques were tolerant of only a single disk failure for any particular block of data, the mapping techniques of the present invention permits a mirrored LUN to remain operational through failure of up to N−1 disks of the array.

Specifically, the block mapping method of the present invention does not limit the mirroring to an even number of images of each block. Rather, the block mapping method of the present invention permits any number of mirrored images to be used for mirroring. The original data plus any number of copies are stored in the mirroring operation. The total number of images of data is therefore N where N is greater than or equal to 2 and less than or equal to M, the number of drives in the LUN. Permitting such flexibility in the number of drives used in the mirroring LUN enhances the flexibility of configuring mirrored and non-mirrored LUNs in a group of disks.

Additionally, the present invention allows disk storage space within the group to be utilized more efficiently. In accordance with the present invention, a single group of disk drives can more easily include mirrored LUNs and non-mirrored LUNs on the same set of disk drives. The flexibility of the present invention in configuring the number of disk drives in a mirrored LUN and in the mapping of blocks to that LUN helps to reduce wasted disk space as noted above with regard to present techniques. The added flexibility of the present invention in allowing configuration of any number of mirrored copies of data blocks permits finer granularity in using all available disk blocks in a mirrored LUN portion of a group of disk drives. Prior techniques allowed only pairs of disk images thereby potentially wasting disk storage space at the end of a mirrored LUN where it abuts another LUN. More specifically where the total number of blocks in the mirrored LUN storage space on the disk array group is odd, techniques of the present invention allow mapping other mirrored copies of data so as to utilize all space available to the LUN on the set of disk drives.

It is generally known in the art that a mirrored LUN may be used to create a "snapshot" copy of the data of the LUN for example for purposes of backup. As is presently taught in the art, when the single mirror copy of the original data is used for a "snapshot" copy as for a backup process, the original data may still be accessed but with potentially diminished reliability. This is because the original data is not being mirrored while the mirrored copy is frozen in use for a snapshot backup copy. The present invention is therefore additionally useful for obtaining a snapshot of the data within the RAID subsystem for backup purposes without diminishing the reliability of the LUN operation. Additional details of the use of disk drives in snapshot copies is in U.S. Pat. No. 5,790,773 issued Aug. 4, 1998.

By contrast, in accordance with the present invention, there are multiple duplicate images of the original data. Only one of the multiple copies need be used "offline" from the mirroring process to perform the requisite backup copy procedures. Remaining mirrored images of the original data help assure reliability of ongoing operation of the LUN while the snapshot copy is used for backup or other purposes.

Another aspect of the present invention is its improved reliability for operation with multiple disk failures using simpler technology as compared to RAID level 6. RAID level 6 techniques require a more complex controller than is required for mirroring as taught by the present invention. The redundancy information of RAID level 6 imposes a computational burden on the RAID controller and further imposes so called "write penalties." Write penalties are known in RAID technology to occur when a relatively small update of information on the disk array requires re-computation and corresponding update of redundancy information associated with the updated data. The update may require reading other related data from the disk array to re-compute the redundancy information. The additional computations for updating the redundancy information and for writing the updated information back to the disk impose further performance penalties on RAID level 6 (and other RAID levels).

By comparison, the present invention has the ability to sustain reliable operation in view of multiple disk failures (i.e., up to N−1 disk failures). However, in so enhancing the reliability, the mirrored operation of the present invention imposes none of the "write penalties" and associated computational complexities of RAID level 6. The present invention therefore provides enhanced reliability as does RAID level 6 but does so with no write penalty and with simpler controller logic.

It is therefore an object of the present invention to provide apparatus and methods for flexibly configuring mirrored LUNs within a group in a disk array storage system.

It is an another object of the present invention to provide apparatus and methods for efficiently combining mirrored and non-mirrored LUNs within a disk array.

It is a further object of the present invention to provide apparatus and methods for N-way mirror block mapping on M drives where M is greater than or equal to N and N is greater than or equal to three.

It is yet another object of the present invention to provide apparatus and methods for N-way RAID level 1 mapping on M drives where M is greater than or equal to N and N is greater than or equal to three.

It is still a further object of the present invention to provide apparatus and methods for N-way mirror block mapping in a RAID storage subsystem on M drives where M is greater than or equal to N and N is greater than or equal to three.

It is still another object of the present invention to provide apparatus and methods for enhancing reliability of a disk storage subsystem to permit continued operation through multiple disk failures.

It is still a further object of the present invention to provide apparatus and methods for enabling a snapshot copy of a mirrored LUN to be used for backup while maintaining redundant operation of the remaining disks in the LUN.

The above and other objects, aspects, features, and advantages of the present invention will become apparent from the following description and the attached drawings.

DETAILED DESCRIPTION OF PREFERRED EMBODIMENTS

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

Figure 1:
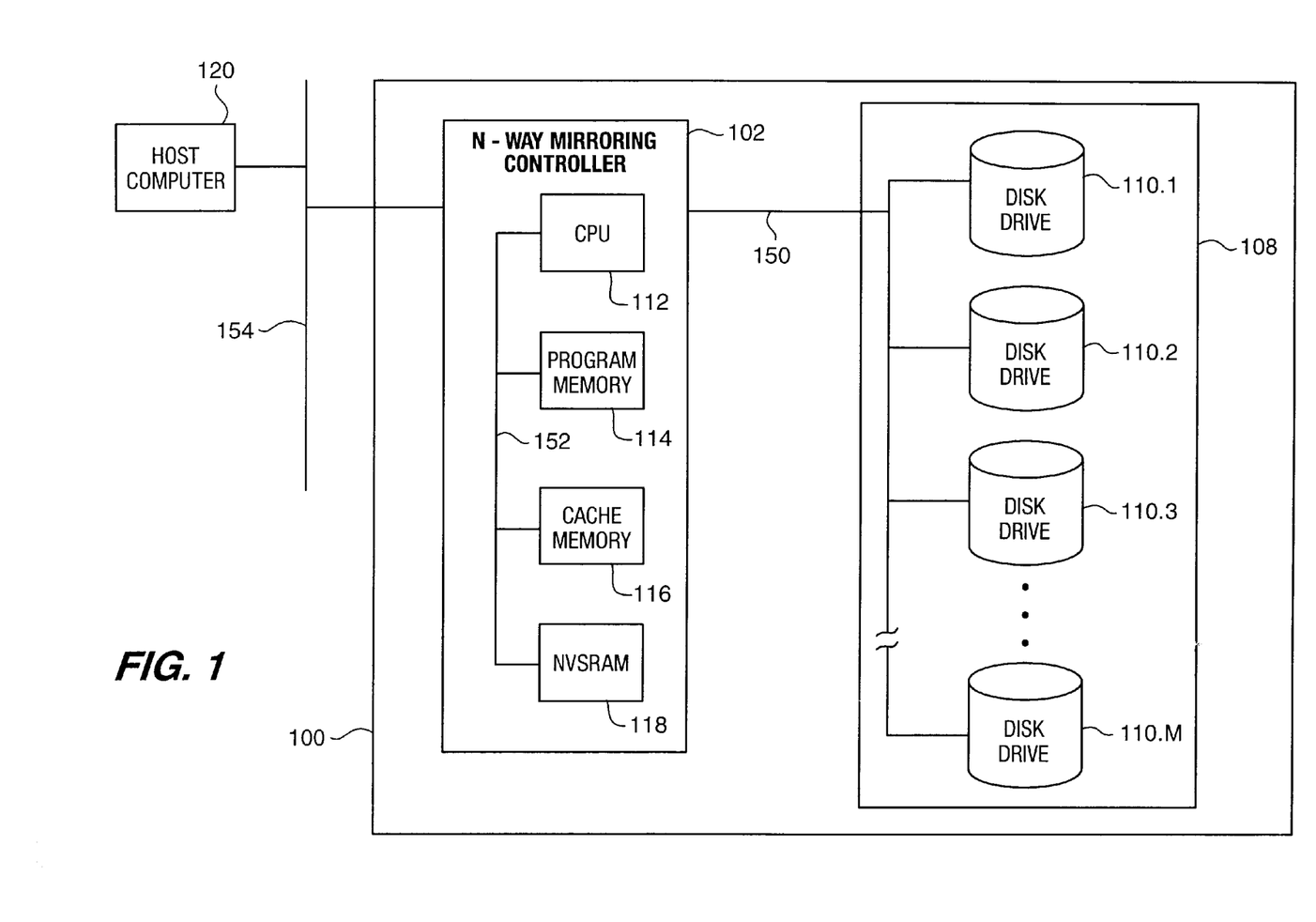
FIG. 1 is a block diagram a disk array storage subsystem in which the methods of the present invention are operable.

FIG. 1 is a block diagram of a disk array storage subsystem 100 in which the mapping structures and techniques of the present invention are advantageously applied. Disk array storage subsystem 100 is connected to host computer 120 via interface 154. Interface 154 may utilize any of several well known interface media and protocols including: SCSI, Fibre Channel, SSA, etc. Disk array storage subsystem 100 receives I/O requests from host computer 120 via interface 154 and preferably returns requisite data and status via the same interface 154.

Disk array storage subsystem includes disk array 108 which, in turn, is comprised of a plurality of disk drives 110.1 through 110.M. As is known in the art, the M disk drives 110.1 through 110.M may be configured to define one or more logical units (LUNs). Each LUN is viewed by the host computer 120 as a separate storage device possessing particular capacity, performance and reliability characteristics.

As is further known in the art, each LUN of the storage subsystem 100 may be managed in accordance with different management techniques. RAID level 1 management, for example, provides redundancy through mirroring of the data written to the disk array. RAID levels 2–6 generally provide redundancy of the data through error checking and correcting techniques which use less storage space than level 1 mirroring. These redundancy techniques are often used with (or defined with) striping techniques to improve performance of the subsystem by distributing the I/O load over more disk drives operating in parallel.

As noted above, prior mirroring techniques have given rise to various problems relating to configuring LUNs in a disk array. Where mirrored and non-mirrored LUNs are configured on the same group of disk drives in the array, storage space may be wasted at the boundary between such LUNs. Further, where an odd number of disk drives are allocated to a particular group, configuration of mirrored LUNs therein may preclude use of one entire disk drive of the group.

N-way mirroring controller 102 of storage system 100 maps logical blocks for each LUN configured in the disk array 108 to particular physical location in disk drives 110.1 through 110.M. More specifically, N-way mirroring controller 102 comprises CPU 112, program memory 114, cache memory 116 and NVSRAM 118 for receiving and processing I/O requests from the attached host computer 120. Methods and structures of the present invention are manipulated within N-way mirroring controller 102 to enhance the flexibility of configuring mirrored LUNs in disk array 108.

Figure 2:
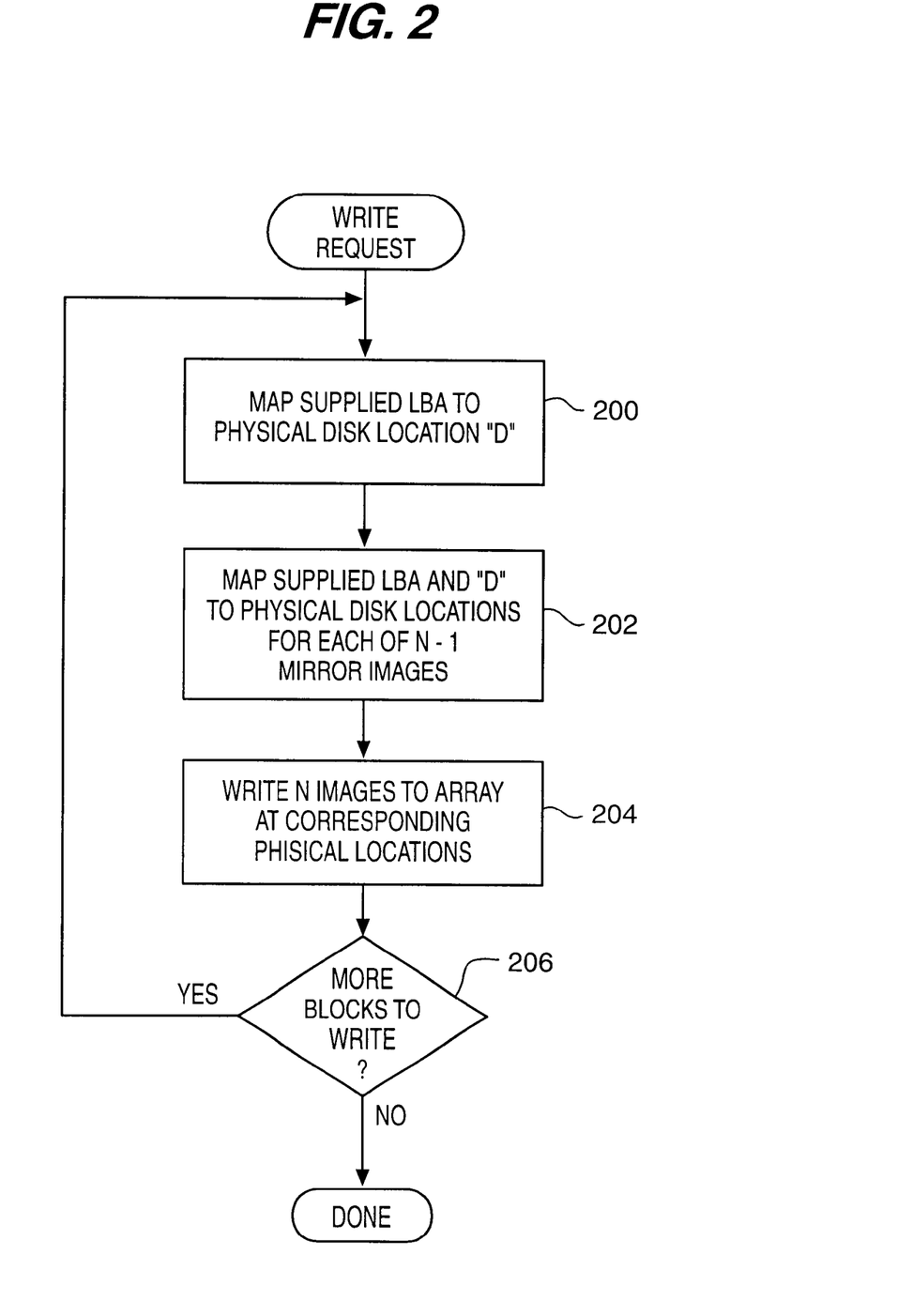
FIG. 2 is a flowchart describing the operation of the methods of the present invention as applied to write I/O operations to map N mirror image blocks of data over M disk drives of a disk array.

FIG. 2 is a flowchart describing the general operation of the methods of the present invention for mapping information in mirrored LUNs. The flowchart of FIG. 2 describes processing within N-way mapping controller 102 of FIG. 1 to perform an I/O request received from a host system. In particular, FIG. 2 describes the processing of a write request which writes host supplied data to a mirrored LUN in a disk array. Those skilled in the art will recognize that read requests perform analogous mapping of logical addresses to physical disk locations. However, read operation need only retrieve the requested data from one of the multiple images.

An I/O request from a host computer is presumed to request operations on a number of blocks of information. The starting block and number blocks affected are typically supplied by the host computer as parameters of the I/O request. Most often, blocks are identified by a logical block address (LBA) which identifies each blocks position relative to the start of the LUN on which it resides. LBAs are therefore typically indices which sequentially number each block from zero through the number of blocks in the LUN. Mapping is the process of transforming such logical addresses (LBAs) to physical disk locations (i.e., a particular physical location on a particular physical disk drive).

Element 200 of FIG. 2 is first operable to map the supplied starting LBA of a write request to a corresponding physical disk location (referred to herein as D). Element 202 is then operable to determine the physical disk location of N−1 mirror images of the first block. The physical disk locations of the mirror image blocks (also referred to herein as duplicate blocks) is generally determined as a function of the LBA of the block and the physical disk location of the block (D).

A block to be written therefore corresponds to N total blocks, the supplied data block and N−1 duplicate blocks. Having so determined the proper physical location for all N blocks to be written, element 204 is then operable to write the N mirror image blocks to the proper positions of the disk array.

Element 206 is then operable to determine whether additional blocks have yet to be transferred to complete processing of the 110 request. If additional blocks remain to be processed, processing of the method continues by looping back to element 200 for each additional block in the I/O request. If no further blocks remain to be processed, the method completes.

Those skilled in the art will recognize that the flowchart of FIG. 2 is intended as generally descriptive of a method which embodies the present invention. The present invention is specifically addressed to the mapping of N mirror images of data over M disk drives where N is greater than 2 and M is greater than or equal to N. Those skilled in the art will recognize many improved or equivalent methods which optimize the write operations (or read operations) on the disk drives to better process the I/O request.

Figure 3:
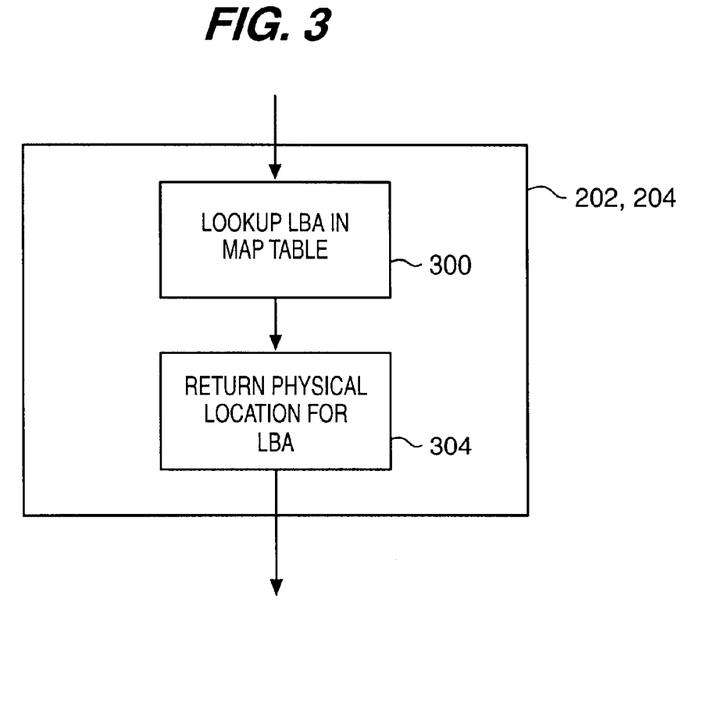
FIG. 3 is a flowchart providing additional details of the operation of a first exemplary embodiment of the mapping step of the flowchart of FIG. 2.

FIG. 3 is a flowchart describing one exemplary preferred embodiment for implementing the mapping functions of elements 202 and 204 of FIG. 2. Specifically, the flowchart of FIG. 3 describes a technique of the present invention whereby the mapping of a logical address to a physical disk location is done by reference to a predetermined lookup table. Such a lookup table would preferably be created at time of mirrored LUN configuration to identify a preferred physical disk location for each LBA and the corresponding N−1 duplicate blocks.

Element 300 is therefore operable to inspect the mapping table given a supplied LBA to determine the preferred physical disk location for the LBA. Element 302 then returns this preferred physical disk location for further processing. Those skilled in the art will recognize that such a table could include entries only for one of the N mirror images such that the other N−1 images are determined by simple calculations from the first. Alternatively, each of the N mirrored blocks could contain a map entry in the mapping table such that the inspection of the table is performed by looking up an entry for a particular image of a particular LBA. A table structure such as used in the flowchart of FIG. 3 may be implemented using any of several well known computing data structures and may be compressed using any of several well known computing techniques to reduce the storage requirements therefor. Such a table structure and the associated method of FIG. 3 may be preferred where computational resources of the N-way mirroring controller are limited as compared to its capacity to store such a mapping table.

Figure 4:
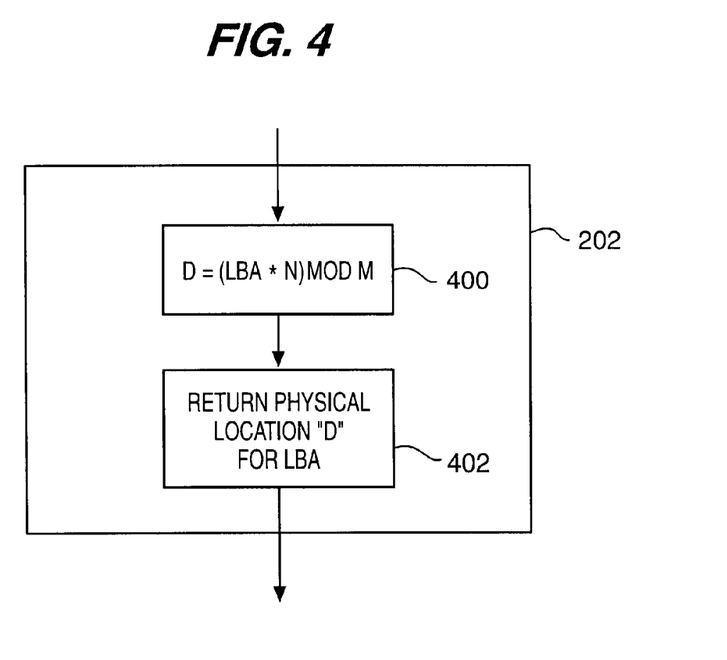
FIG. 4 is a flowchart providing additional details of the operation of a second exemplary embodiment of the mapping step of the flowchart of FIG. 2.

FIG. 4 is a flowchart describing another preferred exemplary embodiment of the mapping methods described generally in element 202 of FIG. 2. Specifically, element 400 is operable to compute a physical disk location D as a function of the LBA supplied from a host request and the values of N and M configured as parameters of the LUN. N (greater than two) is the number of mirror images of data to be written to the array. M (greater than or equal to N) is the number of disk drives configured for the LUN. Specifically, as shown in FIG. 4, element 400 computes D using modulo arithmetic as:

$$D = (LBA * N) \bmod M$$

Element 402 is then operable to return the compute physical disk location for further processing in the method.

Figure 5:
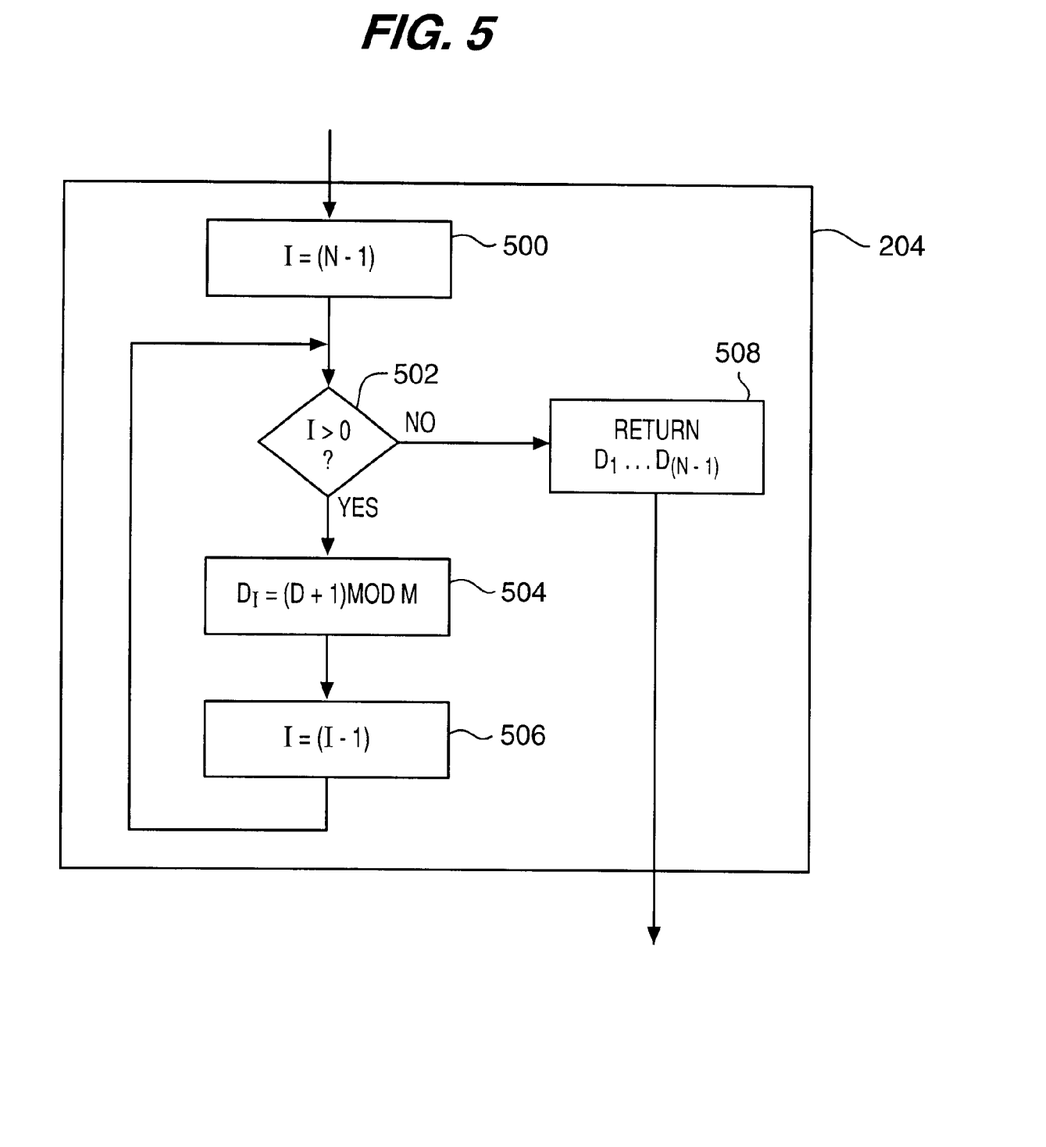
FIG. 5 is a flowchart providing additional details of the operation of a second exemplary embodiment of the mapping step of the flowchart of FIG. 2.

FIG. 5 is a flowchart describing further detail of element 204 of this preferred exemplary embodiment for computing a physical disk location for each of the N−1 duplicate images to be written to the disk array. Element 500 is operable to initialize a local loop counter variable for the number of duplicate images to be written to the array, namely N−1. Elements 502 through 506 are then iteratively operable to compute a physical disk location $D_1$ for each of the N−1 duplicate blocks to be associated with the original block supplied by the host system and associated with the supplied LBA. Specifically, element 502 determines whether more duplicate block physical disk locations need be computed. If not, processing of element 204 is completed by element 508 returning the computed values. If so, element 504 uses the physical disk location D of the original block and computes $D_I$ for each duplicate block as:

$$D_I = (D + I) \bmod M$$

Element 506 then decrements the local loop counter variable I and processing loops back to element 502 to process other duplicate blocks of the mirrored images.

Those skilled in the art will recognize many equivalent methods for determining the physical location of each of the N−1 duplicate blocks of data. For example, the physical location of each of the duplicate blocks may be as easily determined from the LBA of the host system supplied data block. Similarly, those skilled in the art will recognize that the duplicate blocks need not be physically placed on sequential disk drives of the disk array. Many mappings may be envisioned by those skilled in the art such that each of the copies resides on a different disk drive in the group. The computations of FIGS. 4 and 5 are therefore intended merely as representative of a preferred embodiment of the mapping methods of the present invention. This preferred embodiment is easily and therefore rapidly computed by processing of the N-way mapping controller of the storage system.

The mapping of the present invention may also be understood with reference to the following tables which compare prior mapping techniques which were limited to a single pair of mirrored images and the techniques of the present invention.

Tables 1 through 3 below depict 2-way mirroring (i.e., RAID 1) as presently practiced both with and without striping. Tables 4 through 6 below depict N-way mirroring as taught by the present invention both with and without striping. In all tables below, the columns represent a disk drive of a group of a disk array. Each disk drive is labeled as a column header. Each row represents a portion of the corresponding disk drive, a segment or block as commonly understood by those skilled in the art. In each table, the cell at a row/column intersection contains the block number therein and a prime symbol (')to indicate that the block is a duplicate image. Further, the label for each table indicates the values of M and N represented thereby.

Table 1 shows a typical non-striped RAID level 1 mirrored storage system with two disk drives as presently practiced in the art.

TABLE 1

(M = 2, N = 2)

| Segment Offset | Drive 0 | Drive 1 |
| --- | --- | --- |
| 0 | 0 | 0' |
| 1 | 1 | 1' |
| 2 | 2 | 2' |
| 3 | 3 | 3' |
| 4 | 4 | 4' |
| 5 | 5 | 5' |
| 6 | 6 | 6' |
| 7 | 7 | 7' |
| 8 | 8 | 8' |
| 9 | 9 | 9' |

Table 2 depicts a striped RAID level 1 system as presently known in the art. Data is striped over multiple disk drives to improve performance through parallel operating disk drives.

TABLE 2

(M = 4, N = 2)

| Segment Offset | Drive 0 | Drive 1 | Drive 2 | Drive 3 |
| --- | --- | --- | --- | --- |
| 0 | 0 | 0' | 1 | 1' |
| 1 | 2 | 2' | 3 | 3' |
| 2 | 4 | 4' | 5 | 5' |
| 3 | 6 | 6' | 7 | 7' |
| 4 | 8 | 8' | 9 | 9' |

TABLE 2-continued (M = 4, N = 2)

| Segment Offset | Drive 0 | Drive 1 | Drive 2 | Drive 3 |
|---|---|---|---|---|
| 5 | 10 | 10' | 11 | 11' |
| 6 | 12 | 12' | 13 | 13' |
| 7 | 14 | 14' | 15 | 15' |
| 8 | 16 | 16' | 17 | 17' |
| 9 | 18 | 18' | 19 | 19' |

As noted above, typical RAID level 1 and striped RAID level 1 implementations require pairs of disk drives. An additional disk drive configured in the LUN is often left unused by many standard RAID level 1 implementations. Such configurations are wasteful of space as noted above.

Table 3 depicts another mapping of mirrored data as presently known in the art. In this technique, the LUN is not limited to an even number of disk drives. Rather, the striped data is applied to all disk drives of the LUN. However, such techniques have been limited to but a single pair of mirror images of the data. Such requirements can still waste storage space as shown below at the end of the LUN. Where the total capacity of the LUN is not an even number of blocks (or segments) the last block (or segment) could be wasted space.

TABLE 3

(M = 3, N = 2)

| Segment Offset | Drive 0 | Drive 1 | Drive 2 |
|---|---|---|---|
| 0 | 0 | 0' | 1 |
| 1 | 1' | 2 | 2' |
| 2 | 3 | 3' | 4 |
| 3 | 4' | 5 | 5' |
| 4 | 6 | 6' | 7 |
| 5 | 7' | 8 | 8' |
| 6 | 9 | 9' | 10 |
| 7 | 10' | 11 | 11' |
| 8 | 12 | 12' | 13 |
| 9 | 13' | 14 | 14' |

Table 4 shows the flexible use of more than one duplicate block for a mirrored LUN configuration. Specifically, table 4 shows a non-striped mirrored LUN in accordance with the mapping of the present invention. A double prime (") associated with a block number indicates a second duplicate block, three primes a third duplicate block etc.

TABLE 4

(M = 3, N = 3 )

| Segment Offset | Drive 0 | Drive 1 | Drive 2 |
|---|---|---|---|
| 0 | 0 | 0' | 0" |
| 1 | 1 | 1' | 1" |
| 2 | 2 | 2' | 2" |
| 3 | 3 | 3' | 3" |
| 4 | 4 | 4' | 4" |
| 5 | 5 | 5' | 5" |
| 6 | 6 | 6' | 6" |
| 7 | 7 | 7' | 7" |
| 8 | 8 | 8' | 8" |
| 9 | 9 | 9' | 9" |

Table 5 depicts the mapping of the present invention for a striped LUN.

TABLE 5

(M = 6, N = 3)

| Segment Offset | Drive 0 | Drive 1 | Drive 2 | Drive 3 | Drive 4 | Drive 5 |
|---|---|---|---|---|---|---|
| 0 | 0 | 0' | 0" | 1 | 1' | 1" |
| 1 | 2 | 2' | 2" | 3 | 3' | 3" |
| 2 | 4 | 4' | 4" | 5 | 5' | 5" |
| 3 | 6 | 6' | 6" | 7 | 7' | 7" |
| 4 | 8 | 8' | 8" | 9 | 9' | 9" |
| 5 | 10 | 10' | 10" | 11 | 11' | 11" |
| 6 | 12 | 12' | 12" | 13 | 13' | 13" |
| 7 | 14 | 14' | 14" | 15 | 15' | 15" |
| 8 | 16 | 16' | 16" | 17 | 17' | 17" |
| 9 | 18 | 18' | 18" | 19 | 19' | 19" |

Table 6 depicts a mapping in accordance with the present invention where M is not an even multiple of N.

TABLE 6

(M = 6, N = 4)

| Segment Offset | Drive 0 | Drive 1 | Drive 2 | Drive 3 | Drive 4 | Drive 5 |
|---|---|---|---|---|---|---|
| 0 | 0 | 0' | 0" | 0'" | 1 | 1' |
| 1 | 1" | 1'" | 2 | 2' | 2" | 2'" |
| 2 | 3 | 3' | 3" | 3'" | 4 | 4' |
| 3 | 4" | 4'" | 5 | 5' | 5" | 5'" |
| 4 | 6 | 6' | 6" | 6'" | 7 | 7' |
| 5 | 7" | 7'" | 8 | 8' | 8" | 8'" |
| 6 | 9 | 9' | 9" | 9'" | 10 | 10' |
| 7 | 10" | 10'" | 11 | 11' | 11" | 11'" |
| 8 | 12 | 12' | 12" | 12'" | 13 | 13' |
| 9 | 13" | 13'" | 14 | 14' | 14" | 14'" |

As can be seen from the exemplary mappings of the present invention as depicted in tables 4 through 6, the present invention provides additional flexibility for configuring mirrored LUNs in a storage system.

Snapshot Copy Operations

It is generally known in the art to use one of a pair of mirrored disks as a "snapshot" copy of data for backup and other purposes. In other words, while the storage system remains operational with a single disk of the pair still processing I/O requests, the second disk of the pair may be used for backup or other purposes. The mirroring operations of the pair of drives is said to be "broken." During this use of the snapshot copy, the second disk is not updated with new data from I/O requests. When the use of the snapshot copy terminates, the broken mirroring operations are restored and the data on the second disk is updated to reflect any changes made on the first drive. Additional details of the use of disk drives in snapshot copies is in U.S. Pat. No. 5,790,773 issued Aug. 4, 1998.

As presently practiced in the art, the storage system is operating in a degraded mode with respect to reliability while the mirror is broken. Since there is no redundant mirror of the data updated during the period of time the mirror is broken, the system is susceptible to loss of data should the first disk drive, the remaining operational disk drive, fail.

In particular, disk mappings taught by the present invention, the N-way mirrored LUN permits a snapshot copy to be used for backup or other purposes while maintaining highly reliable mirrored operation of the LUN with the remaining disks. For example, where M is an integral multiple of N as in tables 4 and 5 above, a snapshot copy of the LUN may be used for backup or other purposes while the LUN maintains fully redundant operation using the remaining disks in the LUN.

As shown in table 4 above (M=3, N=3), disk drive 2 may be removed from the mirroring operation as a snapshot copy. Disk drives 0 and 1 may then continue mirrored operations with the ability to withstand a single disk failure. When the use of disk drive 2 as a snapshot copy is completed, the LUN is restored to N=3 redundant mirroring for enhanced reliability. In like manner, the mapping described in table 5 above (M=6, N=3) allows for a snapshot to be used for backup while permitting fully redundant continued operation. For example, drives 2 and 5 may be temporarily removed from mirrored operation for use as a snapshot copy of the data in the LUN. Drives 0, 1, 3 and 4 are then available to continue reliable mirrored operation (at N=2). Though the LUN is operating in a somewhat degraded mode (able to withstand only a single disk failure), it is more reliable than prior snapshot copy techniques wherein the number of copies were limited to two (N=2).

Those skilled in the art will recognize that other N-way mirrored disk mappings may permit this enhanced snapshot copy feature of the present invention where one of the multiple mirror images is temporarily removed from the LUN for use as a snapshot copy of the LUN.

Multiple Disk Failures

As noted above, RAID level 6 is distinguished from other RAID levels primarily in its ability to tolerate multiple disk failures (i.e., two disk failures). RAID level 6 provides this feature by storing additional redundancy information as compared to RAID levels 2–5. RAID level 6 techniques require significant computational power in the storage controllers to enable more complex redundancy computations as compared to simple mirroring operations. RAID level 6 therefore trades off computational complexity for reduced storage requirements for the redundancy information. Mirroring requires complete duplicate images of the data to be stored on disks as compared to redundancy computations such as exclusive OR (XOR parity) or other computational techniques.

However, in certain applications, the simplicity of the controller logic for N-way mirroring is preferred over the complexity of RAID levels 2–6 control logic. In particular, N-way mirroring in accordance with the present invention provides a simple solution for tolerating multiple disk failure scenarios which may be preferable to complex RAID level 6 solutions.

Further, RAID level 6 (as well as other RAID levels) suffers from the "write penalty" performance problem as is known in the art. In general, the write penalty is a performance loss for small I/O write requests where the performance of the storage system is diminished due to the need to recompute and update redundancy information stored on the disk drives. A small write request may require that other unmodified data be read so that new redundancy information may be computed. The new redundancy information must then be stored on the disk drives. These additional I/O operations and computation affect the performance of the storage subsystem with respect to small I/O write requests.

By contrast, N-way mirroring of the present invention provides reliability which is tolerant of multiple disk failures without imposing the write penalty inherent in, for example, RAID level 6 techniques.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A method for mirroring data blocks in a disk array storage system having a plurality of disk drives comprising the steps of:

writing a data block to a disk drive of said plurality of disk drives in said disk array storage system;

duplicating said data block in at least one duplicate block written on a corresponding disk drive of said plurality of disk drives in said disk array storage system; and mapping said data block prior to the step of writing to determine a disk drive for said data block to be written to said disk array storage system and to determine a disk drive for each duplicate block of said at least one duplicate block to be written to said disk array storage system, wherein the number of disk drives M in said plurality of disk drives is greater than the total number of blocks N written by the steps of writing and duplicating and wherein said data block is mapped to said disk drive and wherein said at least one duplicate block is mapped to said corresponding disk drive;

wherein said data block is associated with a logical block address and wherein the step of mapping comprises the steps of:

determining said disk drive for writing said data block as a function of said logical block address and N and M; and determining said disk drive for writing each duplicate block of said at least one duplicate block as a function of said logical block address and N and M.

2. The method of claim 1 wherein the step of determining said disk drive for writing said data block comprises the step of:

determining said disk drive for writing said data block as:

$D = (LBA \times N) \bmod M$ where: LBA is said logical block address associated with said data block, and wherein the step of determining said disk drive for writing said each duplicate block comprises the step of:

determining said disk drive for writing said each duplicate block as:

$D_I = (D + I) \bmod M$ where I is an index for each of said at least one duplicate block having values from 1 through N−1.

3. In a disk array storage system having M disk drives where M is greater than two, a method for mapping mirrored data comprising the steps of:

mapping a block of data to a particular disk drive of said M disk drives; and mapping N−1 blocks of mirrored data to N−1 other disk drives of said M disk drives wherein each mirrored block of said blocks of mirrored data is a duplicate of said block of data and wherein N is a total number of blocks mapped and is less than M, wherein said block of data is associated with a logical block address and wherein the step of mapping a block of data comprises the step of:
determining said particular disk drive as:

$$D=(LBA \times N) \bmod M$$

where: LBA is said logical block address associated with said block of data, and
wherein the step of mapping said N−1 blocks of mirrored data comprises the step of:
determining each other disk drive of said N−1 other disk drives as:

$$D_I=(D+I) \bmod M$$

where I is an index for each of said blocks of mirrored data having values from 1 through N−1.

4. A system for mirroring data blocks in a disk array storage system having a plurality of disk drives comprising:
means for writing a data block to a disk drive of said plurality of disk drives in said disk array storage system wherein said plurality of disk drives comprises M disk drives;
means for duplicating said data block in N−1 duplicate blocks written on corresponding other disk drives of said plurality of disk drives in said disk array storage system; and
means for mapping said data block to determine a disk drive for said data block to be written to said disk array storage system and to determine a disk drive for each duplicate block of said N−1 duplicate blocks to be written to said disk array storage system,
wherein N is a number of blocks and is less than M and wherein said data block is mapped to said disk drive and wherein said N−1 duplicate blocks are mapped to said corresponding other disk drives,
wherein said data block is associated with a logical block address and wherein the means for mapping comprises:
means for determining said disk drive for writing said data block as a function of said logical block address and N and M; and
means for determining said disk drive for writing each said duplicate block as a function of said logical block address and N and M.

5. The method of claim 4
wherein the means for determining said disk drive for writing said data block comprises:
means for determining said disk drive for writing said data block as:

$$D=(LBA \times N) \bmod M$$

where: LBA is said logical block address associated with said data block, and
wherein the means for determining said disk drive for writing said each duplicate block comprises the step of:
means for determining said disk drive for writing said each duplicate block as:

$$D_I=(D+I) \bmod M$$

where I is an index for each of said N−1 duplicate blocks having values from 1 through N−1.

* * * * *